UNITED STATES PATENT OFFICE.

GEORGE WELTDEN GESNER, OF NEW YORK, N. Y., ASSIGNOR TO HARLESTON CORBELT GESNER, OF SAME PLACE.

ELECTROLYTIC CELL.

SPECIFICATION forming part of Letters Patent No. 647,960, dated April 24, 1900.

Application filed December 15, 1899. Serial No. 740,416. (No model.)

*To all whom it may concern:*

Be it known that I, GEORGE WELTDEN GESNER, a citizen of the United States, and a resident of New York, in the borough of Brooklyn, State of New York, have invented certain new and useful Improvements in Electrolytic Cells, of which the following is a specification.

My invention consists of an electrolytic cell comprising a vessel and an anode and cathode of an alloy of iron and hydrogen, the hydrogen being present in such quantity as to prevent all oxidizing action, including that arising from chlorin.

The manufacture of the alloy is generally disclosed in a pending application for patent of mine filed March 10, 1896, Serial No. 582,600; also in Letters Patent No. 604,580, dated May 24, 1898, and No. 642,320, dated January 30, 1900, and also in additional pending applications filed December 13, 1899, Serial No. 740,153, and December 15, 1899, Serial No. 740,415. These applications and patents disclose in detail the alloy and processes and apparatuses for making the same.

It will suffice in the present case to state that the alloy of iron and hydrogen is produced from iron ore, steel, manufactured scrap or any other iron, and hydrogen. The association or combination of the hydrogen is stable under all conditions of heat. The specific gravity of the alloy is less than that of iron. The alloy is produced by exposing the iron in a converter at a temperature of about 1,800° to an atmosphere of hydrogen generated by steam injected into the converter from a steam-boiler through a coil of iron pipe constituting the hydrogen-generator and heated either in a separate furnace or in the furnace in which the alloy is made. Another mode of producing the alloy is to expose scrap-iron to hydrogen in the converter and remove the scale formed upon it by stirring-bars inserted through the converter side, afterward grinding and screening such scale to remove any unalloyed iron, and then either fusing it in a crucible or upon open hearth into ingots and drop-forging or rolling them. Another mode is to force the hydrogen through the molten metal and then to remove the alloy that has been formed from the unalloyed iron either by puddling and squeezing or by grinding and sifting. Another mode is direct from iron ore.

I have operated with an alloy of iron and hydrogen in which the latter was present in the proportion of about eleven one-hundredths of one per cent. and upward.

The electrolytic cell comprising the vessel and anode and cathode made from the alloy of iron and hydrogen described is primarily designed for the decomposition of saline solutions and salts in which a considerable amount of chlorin is present and which violently attacks metal surfaces. As before stated, by making the vessel and anode and cathode from the alloy they are capable of resisting oxidation and corrosion from heat or chemical action arising from either atmospheric or more powerful influences. By the term "oxidation" I include the oxidizing action of chlorin on vessels, anodes, or cathodes.

I claim as my invention—

1. An electrolytic cell comprising a part or portion of an alloy of iron and hydrogen, the hydrogen being present in such proportion as to prevent the oxidation (induced for instance by chlorin) of the iron in the said alloy.

2. An electrolytic cell comprising a vessel and an anode and cathode of an alloy of iron and hydrogen, the hydrogen being present in such proportion as to prevent the oxidation of the iron in the said alloy.

3. An electrolytic cell comprising a vessel and an anode and a cathode the latter consisting of an alloy of iron and hydrogen, the hydrogen being present in the proportion of about eleven one-hundredths of one per cent. and upward in the alloy.

In testimony that I claim the invention as above set forth I affix my signature in the presence of two witnesses.

GEORGE WELTDEN GESNER.

Witnesses:
WM. H. MCGRANN,
M. O'DONNOGHUE.